(12) United States Patent
Katahanas et al.

(10) Patent No.: US 12,113,795 B2
(45) Date of Patent: Oct. 8, 2024

(54) SYSTEMS AND METHODS FOR PROVIDING SOFTWARE COMPONENTS AS A SERVICE

(71) Applicants: Atlassian Pty Ltd., Sydney (AU); Atlassian Inc., San Francisco, CA (US)

(72) Inventors: Jonathan George Katahanas, Sydney (AU); Abhinav Kishore, Sydney (AU); Tong Li, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 368 days.

(21) Appl. No.: 17/563,554

(22) Filed: Dec. 28, 2021

(65) Prior Publication Data
US 2023/0208843 A1 Jun. 29, 2023

(51) Int. Cl.
H04L 9/40 (2022.01)
H04L 9/32 (2006.01)
H04L 67/02 (2022.01)
H04L 67/53 (2022.01)
H04L 67/60 (2022.01)
G06F 40/166 (2020.01)
G06Q 10/0631 (2023.01)

(52) U.S. Cl.
CPC .......... *H04L 63/102* (2013.01); *H04L 9/3226* (2013.01); *H04L 63/083* (2013.01); *H04L 67/02* (2013.01); *H04L 67/53* (2022.05); *H04L 67/60* (2022.05); *G06F 40/166* (2020.01); *G06Q 10/06313* (2013.01)

(58) Field of Classification Search
CPC .......... G06F 21/41; G06F 21/31; G06F 21/32;
G06F 21/335; G06F 2221/2115; H04L
63/0815; H04L 63/0807; H04L 63/101;
H04L 67/20; H04L 69/329; H04L
29/12122; H04L 61/1547; H04L 63/102;
H04L 63/105; H04L 63/10; G06Q 50/01;
G06Q 10/10; G06Q 20/223; G06Q 20/32;
G06Q 20/322; G06Q 20/389; G06Q
20/40; G06Q 20/4014
USPC ............ 726/2, 4, 21, 36; 713/150, 163, 181;
380/255, 264, 276
See application file for complete search history.

(56) References Cited

U.S. PATENT DOCUMENTS

| | | | |
|---|---|---|---|
| 7,926,089 B2* | 4/2011 | Tulshibagwale | H04L 63/10 709/225 |
| 11,652,820 B2* | 5/2023 | Huffman | H04L 63/0861 726/4 |
| 2006/0123472 A1* | 6/2006 | Schmidt | H04L 63/0815 726/8 |
| 2007/0154016 A1* | 7/2007 | Nakhjiri | H04W 12/0431 380/270 |

(Continued)

*Primary Examiner* — Sharif E Ullah
(74) *Attorney, Agent, or Firm* — Brownstein Hyatt Farber Schreck, LLP (57) ABSTRACT

A computing architecture for providing a software component or feature of a first platform as a service to a second platform. An API request from a frontend of the second platform, including a user auth token providing access to the second platform, can be received by an authentication token proxy service that converts the user auth token into a user auth token of the first platform. With this token, subsequent API requests of a backend of the first platform from the frontend of the second platform can be served directly by the second platform.

9 Claims, 7 Drawing Sheets

(56) References Cited

U.S. PATENT DOCUMENTS

| | | | | |
|---|---|---|---|---|
| 2007/0169171 | A1* | 7/2007 | Kumar | H04L 63/102 |
| | | | | 726/2 |
| 2010/0228982 | A1* | 9/2010 | Zhu | H04L 9/3271 |
| | | | | 713/175 |
| 2013/0047218 | A1* | 2/2013 | Smith | H04W 12/068 |
| | | | | 726/4 |
| 2014/0101453 | A1* | 4/2014 | Senthurpandi | G06F 21/32 |
| | | | | 713/172 |
| 2015/0007273 | A1* | 1/2015 | Lin | H04L 47/10 |
| | | | | 726/4 |
| 2015/0135277 | A1* | 5/2015 | Vij | H04L 63/0892 |
| | | | | 726/4 |
| 2015/0142968 | A1* | 5/2015 | Bhagwat | H04L 67/51 |
| | | | | 709/224 |
| 2015/0244690 | A1* | 8/2015 | Mossbarger | H04L 9/50 |
| | | | | 713/171 |
| 2015/0332283 | A1* | 11/2015 | Witchey | G06F 21/00 |
| | | | | 705/3 |
| 2016/0205106 | A1* | 7/2016 | Yacoub | H04W 12/041 |
| | | | | 726/28 |
| 2016/0210626 | A1* | 7/2016 | Ortiz | G06Q 20/023 |
| 2018/0041487 | A1* | 2/2018 | Wang | G06F 16/9535 |
| 2019/0320036 | A1* | 10/2019 | Dowlatkhah | H04L 67/565 |
| 2020/0348852 | A1* | 11/2020 | Duggal | G06F 3/0604 |
| 2021/0334821 | A1* | 10/2021 | Berrington | H04L 63/083 |

* cited by examiner

SYSTEMS AND METHODS FOR PROVIDING SOFTWARE COMPONENTS AS A SERVICE

TECHNICAL FIELD

Embodiments described herein relate to cloud-based software platforms and, in particular, to systems and methods for providing software components as a service to third-party or first-party software platforms.

BACKGROUND

An organization can establish a collaborative work environment by providing its employees with access to a suite of discrete software platforms to facilitate cooperation and completion of work. In many cases, an organization may also define policies outlining best practices for recording, formatting, organizing, and accessing data associated with each software platform of a suite of software platforms.

However, different software platforms are typically designed and implemented in platform-specific ways and, as a result, users of multiple platforms are required to become familiar with the features and limitations of each individual platform. This requirement is both time and resource consuming for employees, reducing overall team and individual productivity.

SUMMARY

Embodiments described herein can take the form of a method for providing software functions and components of one software platform as a service to another software platform. As a result of the embodiments and architectures described herein, both platforms can present a consistent user experience despite that each platform may be configured for a different purpose.

For example, a first platform may be a collaborative documentation platform and the second platform may be a project management tool. The collaborative documentation platform may include a rich text component to receive text input from users and to provide those users with a feature set related to formatting, styling, and organizing textual data. The project management tool may likewise receive or solicit text input from one or more users (e.g., inputting project descriptions, titles, and so on). In this example, for embodiments described herein, the project management tool may leverage the rich text component of the collaborative documentation platform such that when users provide rich text input to either platform, the user experience is substantially the same.

In another phrasing, the collaborative documentation platform may be configured to provide, as a service, its rich text component to the project management tool. In this manner, whenever maintainers of the collaborative documentation platform update, improve, reorganize, fix, or add features to the rich text component, the project management tool may be likewise immediately improved without requiring maintainers of the project management tool to implement any changes.

More generally, as a result of architectures described herein, a user of a first platform can interact with a feature, service, component, or function of a second platform without needing to context switch between platforms, without needing authorization to access the second platform, and without needing experience with the second platform. These systems and methods can dramatically improve efficiency of users interacting with multiple platforms in a multiplatform software environment.

For example, in one embodiment, a first software platform can be defined, at least in part, by a processor allocation and a memory allocation operable to instantiate an instance of a software application providing server-side (backend) functionality of the first software platform. The backend software application (or, simply, the first platform "backend") can be configured to interface, and/or communicate, with a corresponding instance of a software application instantiated on a client device, such as a cellular phone, tablet, or computer.

The second software application may be configured to provide client-side (frontend) functionality for the first software platform. In many cases, the frontend software application (or, simply, the first platform "frontend") may generate a user interface with which a user of the first platform can interact. In this example, the first platform frontend can include a frame in which an interface component rendered by a backend of a second software platform can be displayed.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for providing software components and features as a service between software platforms in a secure and authenticated manner.

As a result of architectures described herein, developers of software platforms can dedicate more resources to developing key platform-differentiating features, without needing to allocate resources to development of software components that are already implemented in other platforms.

More particularly, embodiments described herein reference systems and methods for automatically creating, for users of a first platform, shadow user accounts at a second platform so that users of the first platform, while authenticated to the first platform, can access features and functionality of the second platform (in an authenticated manner) as though those users were original users of the second platform. As a result of this architecture, software components of the second platform can be provided as a service to the first platform.

For example, the second platform may include a feature-rich document creation component that facilitates rich-text formatting, multimedia sizing and placement functionality, data visualization, and so on. Users of the second platform can leverage this document creation component within the second platform to create content-rich documents that may be used to record and share information.

The first platform may be configured for a different primary purpose but may also nevertheless receive or solicit text input from a user from time to time. In conventional examples, developers of the first platform may implement a rudimentary text input feature or import an existing third-party text input framework, neither of which may provide as rich a feature set as the document creation component of the second platform referenced above.

Embodiments described herein reference a system for sharing fully-developed and feature-rich components between software platforms by providing an architecture to serve existing software components as a service. More particularly, the architectures described herein leverage an account and authentication token translation service that securely converts authentication tokens associated with users of a first platform to authentication tokens associated with users of a second platform. As a result of these authentication token translation operations, the first platform—and in particular a frontend of the first platform—can structure a request to a backend of the second platform that presents as a native request originating from a frontend of the second platform itself. In response to the request, the second platform backend serves data—which may include user interface information and/or UI rendering instructions (e.g., HTML, JavaScript, CSS, or the like)—to the request originator (here, the frontend of the first platform) which in turn can use that data to render a graphical user interface to the user of the first platform.

In a more simple and non-limiting phrasing, embodiments described herein reference systems and methods for structuring requests from a first platform into a form and format (and with appropriate auth tokens) expected by a second platform. In this manner, from the perspective of a backend of the second platform, the request (that originated from the first platform) appears to originate from a native client/frontend of the second platform, and as such, the second platform backend responds and/or otherwise reacts to the request, thereby providing one or more features or functionality of the second platform to the first platform.

As a result of the constructions described herein, any suitable feature or functionality of a software platform can be provided, as a service, to a different software platform. These constructions allow developers of the other software platform to dedicate more development time and resources to improvement of platform-differentiating features, which is in direct contrast to conventional full-stack software development techniques which as known to a person of skill in the art require allocation of resources to development, integration, and/or maintenance of third-party imports.

More broadly, as known to a person of skill in the art, conventional full-stack software development requires software developers to build and maintain software that supports both frontend and backend functionality of each feature and function that a particular software product is designed to provide to its users.

As known to a person of skill in the art, full-stack software development—especially with limited resources (e.g., a small team of developers)—is both time consuming and difficult to optimize and secure. In many cases, this difficulty and delay results from a need to create and/or import (and configure) software that provides backend and frontend functionality of certain desirable features of a given software product. This is development time a team of developers might otherwise spend building out platform-differentiating features.

For example, a team of software developers may be interested in creating a blogging platform with a differentiating feature related to how subscribers are notified of new blog content. As with many software platforms, the blogging platform may require a backend and a frontend. The backend may require user authentication features, user account features (creation, management, deletion, and so on), user profile pictures, database services, rich text and/or multimedia user input fields and formatting frameworks, and so on in addition to all software components related to the differentiating subscription/notification feature.

In some cases, the developer team in this example may also be required to configure and/or maintain physical infrastructure supporting one or more of these backend features, which may include configuring one or more SSL certificates (and scheduling updates thereof), one or more reverse proxies or query gateways, one or more server systems, provisioning and/or orchestration tools, and so on.

Further still, the developer team may be required to develop a frontend, which may be a dynamically-generated webpage that necessitates development of robust style sheets, browser-executable code, server-executable code, and so on.

In this example, as may be understood by a person of skill in the art, a significant quantity of development effort must be spent on implementing features and functionality entirely unrelated to the differentiating feature of the product. As a result, a software project such as the blogging platform may require a substantial period of time and substantial expertise to transition from a proof of concept to a production-ready software product. Undesirably, a substantial majority of this time is spent on tasks unrelated to the differentiating features of that product. As one example, if a simple software product requires 1000 hours to develop, it may be the case that 800 of these hours (or 80% of development time) are dedicated to building, testing, and integrating features and functionality unrelated to key differentiating features of that software product.

In some conventional cases, a development team such as the development of the preceding example building a blogging platform, may leverage third-party and/or open source frameworks or imports in order to minimize from-scratch development. For example, a development team may identify a JavaScript library that helps render a rich-text input area in a webpage. The team may also identify a third-party framework, from a separate third-party, to provide user authentication and account management.

However, as known to a person of skill in the art, incorporating third-party code into a production environment presents several security risks and implementation problems. For instance, in the preceding example, the development team is not in control of the feature set, maintenance schedule, support schedule/responsiveness of either the user authentication service or the rich-text input area script. Worse, the development team is not in control of any imports, frameworks, APIs, or other dependencies that the third-party code itself relies upon.

As a result, growth and feature expansion of the blogging platform may be substantially limited by external influences outside of the control of the developers of the blogging platform. For instance, the rich-text input area JavaScript may become non-functional (or may leverage one or more APIs that in turn are depreciated by a separate third party), leaving users of the blogging platform unable to enter text until the development team can find a workaround or can update the rich-text input area script. In another example, the authentication framework may fail to support a particular top-level domain, rendering the blogging platform useless for particular users, such as users in a foreign jurisdiction with country code top level domain based addressing.

In yet other examples, users of the blogging platform may submit feature requests that relate to text input. In these examples, the development team may be required to choose between (1) developing additional features on top of the imported rich-text input area JavaScript or (2) depreciating support of the rich-text input area JavaScript in favor of developing an in-house rich text input area component. Either option, as known to a person of skill in the art, presents many risks and necessitates substantial investment of resources.

More generally and broadly, it may be appreciated that in conventional full-stack software development lifecycles, development teams often are required to dedicate substantial resources to maintaining third-party code, maintaining third-party API compliance, and/or maintaining ongoing business relationships with vendors of third-party frameworks.

As a more general example, some conventional software platforms may include a document editor so that users of the software platform can provide formatted and structured text input to that software platform. Conventionally, as noted above, each individual software platform that provides document editing features either requires developers to (1) design, develop, implement and maintain an in-house, platform-specific, document editor or (2) import to the platform a third-party implementation of a document editor, that requires periodic maintenance, updates, and monitoring.

In another example, some conventional software platforms may authenticate users with a single sign-on service (SSO) and/or a two-factor authentication (2FA) service. Conventionally, each individual software platform would either (1) design an in-house SSO or 2FA system, (2) import to the platform a third-party authentication framework, or (3) implement support for integrating a third-party authentication API, integration with which requires periodic maintenance, updates, and monitoring and relies heavily on the uptime reliability of the third party providing that API.

In yet another example, conventional software platforms may include a file type converter so that users of the software platform can leverage the software platform to convert between different file types. Conventionally, each individual software platform would either (1) design, develop, implement and maintain an in-house filetype conversion system or (2) import to the platform a third-party framework, that requires periodic maintenance, updates, and monitoring.

In yet another example, software platforms may include a multimedia playback component so that users of the software platform can view various media types from a user interface of the software platform. As with other examples, conventionally, each individual software platform would either (1) design, develop, implement and maintain an in-house multi-format multimedia playback system or (2) import to the platform a third-party framework system, that requires periodic maintenance, updates, and monitoring.

As known to a person of skill in the art, and as noted above, each of these conventional options command substantial maintenance and development attention, which in turn can delay rollout of new and differentiating features of a given software platform. In addition, these conventional systems and methods of developing software often result in smaller feature sets or more rudimentary implementations of commonly-used/commonly-needed software components such as authentication components, user account management components, document creation and editing components, and so on.

By contrast, embodiments described herein provide a mechanism to serve full-featured software components of existing client-server software platforms as a service to an arbitrary number of other software platforms. In particular, a system as described herein includes an authentication token proxy service that receives, as input, an API request including at least one authentication token associated with a user of a first software platform.

The authentication token proxy service converts the received token into an authentication token associated with a second software platform and, in certain embodiments, replaces the original authentication token from the input API request with the converted authentication token. Thereafter, the authentication token proxy service can forward the modified API request to the second platform or may provide the modified API request back to the originator of the request (optionally, along with a URL to the second platform). In response to receiving the modified API request, the second platform can respond to the originator of the original API request in the same manner that the second platform would respond to an API request from a native frontend of the second platform.

In this manner, a frontend of a first platform can send a request to a backend of a second platform and, in response, the backend of the second platform can respond to the frontend of the first platform in the same manner that the backend of the second platform would respond to a frontend of the second platform. In many examples, this architecture can be leveraged to provide one or more graphical user interface components to the frontend of the first platform so that users of the first platform can engage with features and components typically reserved for users of the second platform.

For example, a first platform may be a collaborative documentation platform that includes a full-featured document editing and creation component configured to be rendered in a user's browser. The component may be defined at least in part by dynamic HTML, CSS, and JavaScript and may open one or more WebSockets to a backend of the collaborative documentation platform to provide real-time interactive features, such as a search feature or a URL prefetch/preview feature.

In this example, when a frontend of the collaborative documentation platform (e.g., a browser) submits an authenticated request to the backend, the backend serves appropriate HTML, CSS, and JavaScript to the frontend, causing the frontend to render a graphical user interface associated with the full-featured document editing and creation component. As a user of the frontend operates the component to create a document, the frontend may periodically communicate with the backend so that the user's work is regularly saved in a database of the backend. In other cases, the frontend may communicate with the backend to provide one or more rich features to the user while the user is creating the document, such as real-time (or near real time) spelling and grammar checking, cross-linking, pasted URL or media actions or automations, and so on.

In an embodiment described herein, a second platform may be a web-based email client. As with the first platform referenced above, the email client may include a backend configured to serve dynamic and/or custom HTML, CSS, and JavaScript to a user's browser to render a graphical user interface associated with the email client application. In this example, as known to a person of skill in the art, a compose email function of the web-based email client may be preferably implemented with all or substantially all features of the full-featured document editing and creation component provided by the collaborative documentation platform.

In this example, the frontend of the second platform may be configured to submit a request to the backend of the first platform in order to render the full-featured document editing and creation component within a frame of the web-based email client's own UI.

However, in this example and other similar examples, the first platform and the second platform are different software platforms, potentially owned, operated, and maintained by different organizations. Additionally, each platform maintains its own user account database. As a result, the frontend of the second platform cannot submit a request to the backend of the first platform without proper authentication and authorization.

Accordingly, for embodiments described herein, the second platform frontend's API request to the backend of the first platform may be submitted to an authentication token proxy service configured to maintain an association table linking user accounts of the first platform to user accounts of the second platform.

More particularly, in this example, the web-based email client frontend can construct a request, including an auth token associated with a user account of the web-based email client, to the collaborative documentation platform backend. This request can be intercepted (or otherwise first received) by the authentication token proxy service.

In response to receiving this API request, the authentication token proxy service can identify a user account of the web-based email client from the received auth token. Thereafter, the authentication token proxy service can construct a query (or, more broadly, a transaction to) an association table to obtain a corresponding related account at the first platform, the collaborative documentation platform. Thereafter, the authentication token proxy service can create an authentication token based on the corresponding related account, and can modify the original API request to include this auth token.

In some examples, the authentication token proxy service can be configured to return the modified API request back to the frontend of the web-based email client. In other cases, the authentication token proxy service can be configured to forward the modified API request to the backend of the collaborative documentation platform backend directly. The authentication token can be associated with a particular user, a particular role, a particular team, a particular session, a particular platform, a particular tenant, and/or any other suitable token.

In response to receiving the modified API request, as with the native request described above, the backend of the collaborative documentation service serves appropriate HTML, CSS, and JavaScript to the frontend of the web-based email client, causing that frontend to render, within a frame of the UI of the web-based email client, a graphical user interface associated with the full-featured document editing and creation component. As with native client interactions, as a user of the email frontend operates the document creation component to create an email body, the frontend may periodically communicate including the appropriate auth token with the first platform backend so that the user's work is regularly saved in a database of the first platform backend. In other cases, as noted above, the frontend may communicate with the backend to provide one or more rich features to the user while the user is creating an email, such as real-time (or near real time) spelling and grammar checking, cross-linking, pasted URL or media actions or automations, and so on.

As a result of the constructions described herein, the second platform can leverage all (or some) features of the first platform as an authenticated user of the first platform. In some examples, the reverse may also be implemented; the documentation system may leverage in the manner described above and herein, one or more features of the web-based email client.

More generally and broadly, the embodiments described herein reference systems and methods for sharing individual software components and features between different software platforms in an authenticated and secure manner.

As noted above, a software platform as described herein may include a frontend and a backend configured to communicably couple over a computing network (which may include the open Internet) to exchange computer-readable structured data. Many software platforms described herein may be architected as software as a service platforms configured to operated over the open Internet to render custom webpages within user browser windows, although it may be appreciated that this is merely one example construction and other embodiments can be implemented with native applications.

A frontend as described herein may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, multitenant embodiments presented herein reference software platforms from the perspective of a single common tenant. For example, as known to a person of skill in the art, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

As noted above, a frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval.

One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data.

In particular structured data that includes tenant-owned content may be referred to herein as a "data object" or a "tenant-specific data object." In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multimedia, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers."

As known to a person of skill in the art, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform. The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service. As with preceding examples, the organization can create and/or purchase user accounts for its employees, so that certain selected employees have access to one or more of issue tracking functionality, documentation functionality, and code repository functionality.

In this example and others, as known to a person of skill in the art, it is exceptionally common to leverage multiple collaboration tools to advance individual projects or goals. For example, for a single software development project, a software development team may use (1) a code repository to store project code, executables, and/or static assets, (2) a documentation service to maintain documentation related to the software development project. (3) an issue tracking system to track assignment and progression of work, and (4) a messaging service to exchange information directly between team members.

However, as organizations grow, as project teams become larger, and/or as software platforms mature and add features or adjust user interaction paradigms over time, using multiple software platforms can become inefficient for both individuals and organizations, especially when those different platforms implement different and platform-specific features that perform similar functions.

For example, when a developer submits a new pull request to a repository service, that developer may also be required by the organization to (1) describe the pull request in detail from within the repository service, (2) update a description of the pull request in a documentation service, (3) change a project status in a project management application, and/or (4) close a ticket in a ticketing or issue tracking system relating to the pull request. In each of these examples, the developer may be presented with different user interfaces for entering text input, each of which may have slightly different icons, different hotkeys/shortcut keys, different formatting options, and so on. The differences between similar functions of different platforms may cause confusion, frustration, or other inefficiencies.

By contrast, leveraging embodiments described herein, the repository service, the documentation service, and the project management application can all use the same text entry component of the documentation service so that the developer has a consistent and uniform experience of using all three platforms.

These foregoing and other embodiments are discussed below with reference to FIGS. 1-4. However, those skilled in the art will readily appreciate that the detailed description given herein with respect to these figures is for explanation only and should not be construed as limiting.

Figure 1:
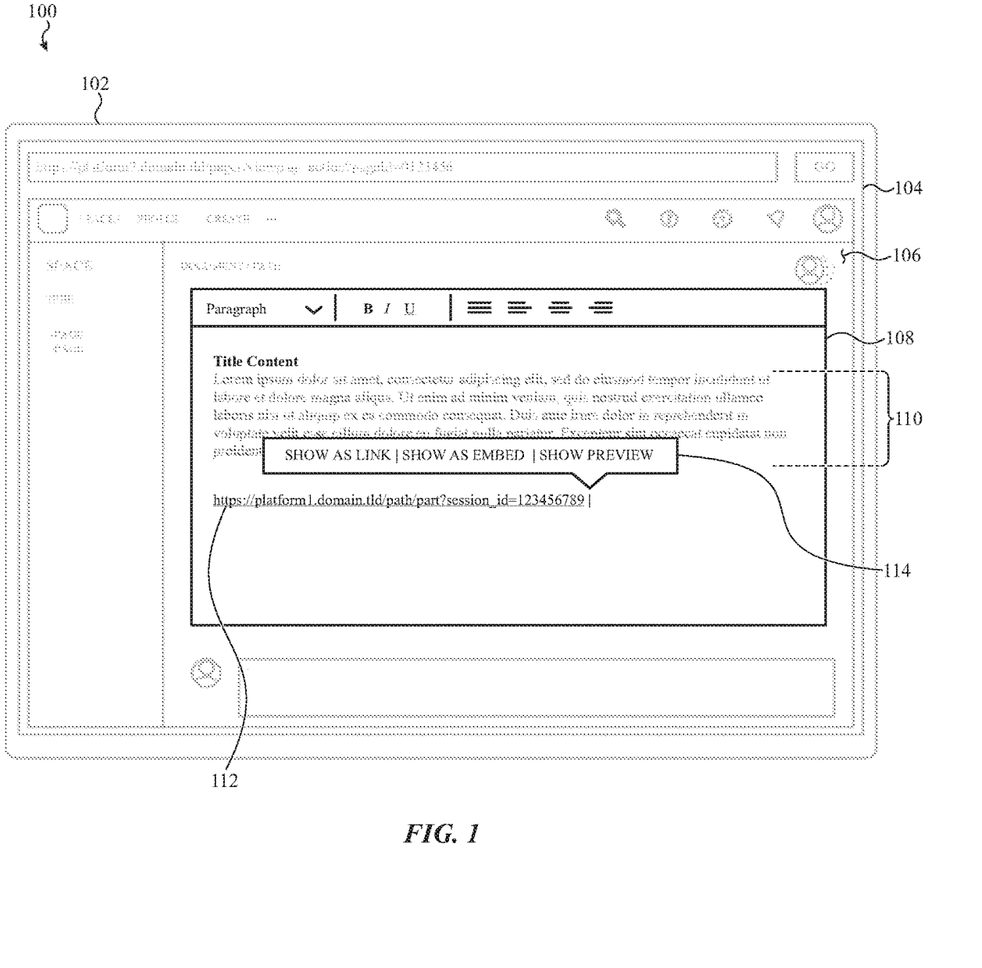
FIG. 1 depicts an electronic device executing an instance of a frontend application associated with a first software platform, the instance rendering a graphical user interface including an interface element associated with a specific software component of the first platform.

Generally and broadly, FIG. 1 depicts a graphical user interface that can receive user input and that is rendered by a frontend of a software platform, such as described herein. The software platform can be configured to provide a feature or function of the platform as a service to a second platform.

The software platform may be any suitable software platform. An example software platform may be a collaboration tool that is one of a suite of collaboration tools defining a collaborative work environment.

Example collaboration tools can include, without limitation: messaging services; telecommunication services; videoconferencing services; issue tracking services; repository services; documentation services; document management systems; knowledge sharing systems; project management services; enterprise resource planning services; supply chain management services; and so on.

In the illustrated embodiment, the software platform is a documentation service, although it is appreciated that this is merely one example.

In particular, the documentation service of FIG. 1 includes a client device 100. The client device 100 can be any suitable electronic device; examples include a desktop or laptop computing device. In other examples, the client device 100 may be a mobile device such as a tablet or a cellular phone. It may be appreciated that these example electronic devices are not exhaustive; any suitable device may be a client device as described herein.

The client device 100 may include a processor and a memory or, more generally, a processor allocation and a memory allocation. The processor may be any suitable virtualized or physical computing device or logical circuit configured to execute one or more instructions to perform or coordinate one or more operations on or to digital data. In many embodiments, the processor or processors of the client device 100 may be a physical processor, although this is not required of all embodiments; virtual components or portions thereof may be suitable in some implementations.

Similarly, a memory of the client device 100 may be configured and/or implemented in a number of suitable ways and may be partially or completely virtualized.

In typical examples, the processor of the client device 100 is configured to access at least one executable asset from the memory of the client device 100. More particularly, the processor of the client device 100 may be configured to access a data store portion of the memory to load, into a working portion of the memory, at least one executable asset or executable program instruction. In response to loading the instruction or executable asset into working memory, the processor of the client device 100 may instantiate an instance of software referred to herein as a client application.

In many embodiments, a client application (also referred to as a "frontend") may be configured to provide client-side functionality of a software platform (a documentation service, for FIG. 1). More specifically, the client application may be configured to communicably couple to a separate instance of software executing on, and/or instantiated by, a host system or server configured to provide server-side ("backend") functionality of the software platform (documentation service). In this manner, the documentation service is defined in part by a frontend executing/instantiated on a client device and in part by a backend executing/instantiated on a host server in communication with the frontend.

In some cases, the host server supporting the backend is configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another.

In this manner, because specific implementations may vary, both the host server and the client device 100 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

In view of the foregoing, it may be appreciated that the documentation service of FIG. 1 can include both a host server (not shown in FIG. 1 for simplicity of illustration) and the client device 100. Both the client device 100 and the host server each execute different instances of software that are communicably intercoupled over a computing network.

Specifically, as noted above, the host server executes a backend software application and the client device executes a frontend software application, thereby cooperatively defining the documentation service.

The backend and the frontend of the documentation service (or any other software service described herein) can communicate according to any suitable protocol, form, or format. In many examples, the backend at least partially exposes an application programming interface ("API") that can be accessed by the frontend to perform one or more functions and/or to present data in one or more formats. For example, the frontend may leverage the API to request from and/or provide content to (such as described above) the backend so that the tenant content can be displayed to a user of the client device 100.

For simplicity of description, the embodiments that follow reference a configuration in which a backend and a frontend are configured to communicate and transact information according to a REST API, but it may be appreciated that this is merely one example and in other embodiments other signaling, communication, or data transaction methodologies may be used.

Returning to FIG. 1, in some embodiments the frontend may be a native application configured to execute over the processor(s) of the client device 100. In other cases, the frontend may be configured to operate with and/or in a web browser application. For simplicity of description, the embodiments that follow reference an implementation in which the client application is a browser configured to render the frontend of the documentation service within the browser. It may be appreciated, however, that this is merely one example and is not limiting.

As with many software services, the frontend of the documentation service shown in FIG. 1 is configured to render a graphical user interface for displaying information to a user of the client device 100. More specifically, in many embodiments, the client device 100 includes a display 102 that can be leveraged to render the graphical user interface 104.

The graphical user interface 104 can take any suitable form or shape defined by the frontend or the backend of the documentation service. In the illustrated example, the graphical user interface 104 includes a content view 106 into which a document creation interface component 108 can be rendered.

The document creation interface component 108 can be rendered in the content view 106 in response to a request from the frontend of the backend. In particular, a user operating the client device 100 may select an affordance in the graphical user interface 104 indicating an intent to create or modify a document stored by the documentation service. In response to receiving this input from the user, the frontend can create a request to the backend requesting access to the document creation component. In response, the backend can provide a response to the frontend including HTML, CSS, and/or JavaScript necessary for the frontend to render the document creation interface component 108.

The document creation interface component 108 can include a number of features and options for a user. Examples include formatting options, text placement/alignment options, style options, attachment options, multimedia options, data display options, and so on. For example, the user may input plain text into a user input area 110 of the document creation interface component 108.

In many embodiments, the document creation interface component 108 can provide rich features that leverage a WebSocket or other live connection to the backend of the documentation service. For example, in some embodiments, the document creation interface component 108 can be configured to monitor user input to the user input area 110 for specially formatted content, such as a URL 112. In response to detecting that the URL 112 has been input by a user of the document creation interface component 108, the document creation interface component 108 can present an overlay interface 114 that provides one or more options to the user. In the illustrated example, the user is presented with an option to display the URL 112 as a link, as an embedded webpage, or as a preview of the anchor of the URL 112. In other cases, the overlay interface 114 may also suggest to trigger one or more automations based on the content and/or source of the URL 112. For example, the overlay interface 114 can suggest to the user to create an automation that checks the URL 112 on a regular basis for updates. This is merely one example; any suitable content or option can be included in the overlay interface and, additionally, any suitable content can be recognized and/or acted upon in a manner such as described herein.

As the user makes a selection of an option, the frontend can automatically generate a request back to the backend to cause the backend to act on the user's selection. As one example, if the user selects the option to create a preview of the pasted link (e.g., the URL 112), the frontend can submit a request to the backend including the URL 112. In response, the URL can be accessed by the backend and a preview of the URL can be rendered by the backend which, in turn, can forward the generated preview back to the frontend for display within the document creation interface component 108.

This is merely one example; a person of skill in the art may readily appreciate that a software component of a software platform can be configured to operate in a number of suitable ways and may implement any number of suitable features, all or some of which may require authenticated communication with a backend.

In particular, in many embodiments, users of the documentation platform may be authenticated to the documentation platform. In most configurations, a user after having logged into the documentation platform will receive or create a token, typically referred to as an "auth token" that can be presented/bundled with subsequent API requests to the documentation platform backend so that each individual API request is serviced by the backend if and only if a valid auth token is included with it.

As noted above, embodiments described herein include an authentication token translation/proxy service to translate user accounts and auth tokens associated with those user accounts between different platforms. For example, a first user account at a first platform may be associated with a second user account at a second platform. However, an auth token for the first user account may not be accepted by the second platform. To overcome this limitation, as noted above, an authentication translation/proxy service may be used to create an auth token accepted by the second platform from the first auth token accepted by the first platform. More simply, the translation/proxy service may be configured to create, provide, and distribute authentication tokens between multiple platforms.

In some cases, shadow user accounts can be created at a second platform so that users of a first platform can use functions and features of the second platform. In other cases, existing user accounts at a second platform can be associated with existing user accounts at a first platform. These examples are not exhaustive; a person of skill in the art may readily appreciate that auth token translation can be performed in a number of suitable ways.

Also as noted above, translating auth tokens between different platforms can be leveraged to serve individual software components as a service by and between different platforms.

Figure 2A:
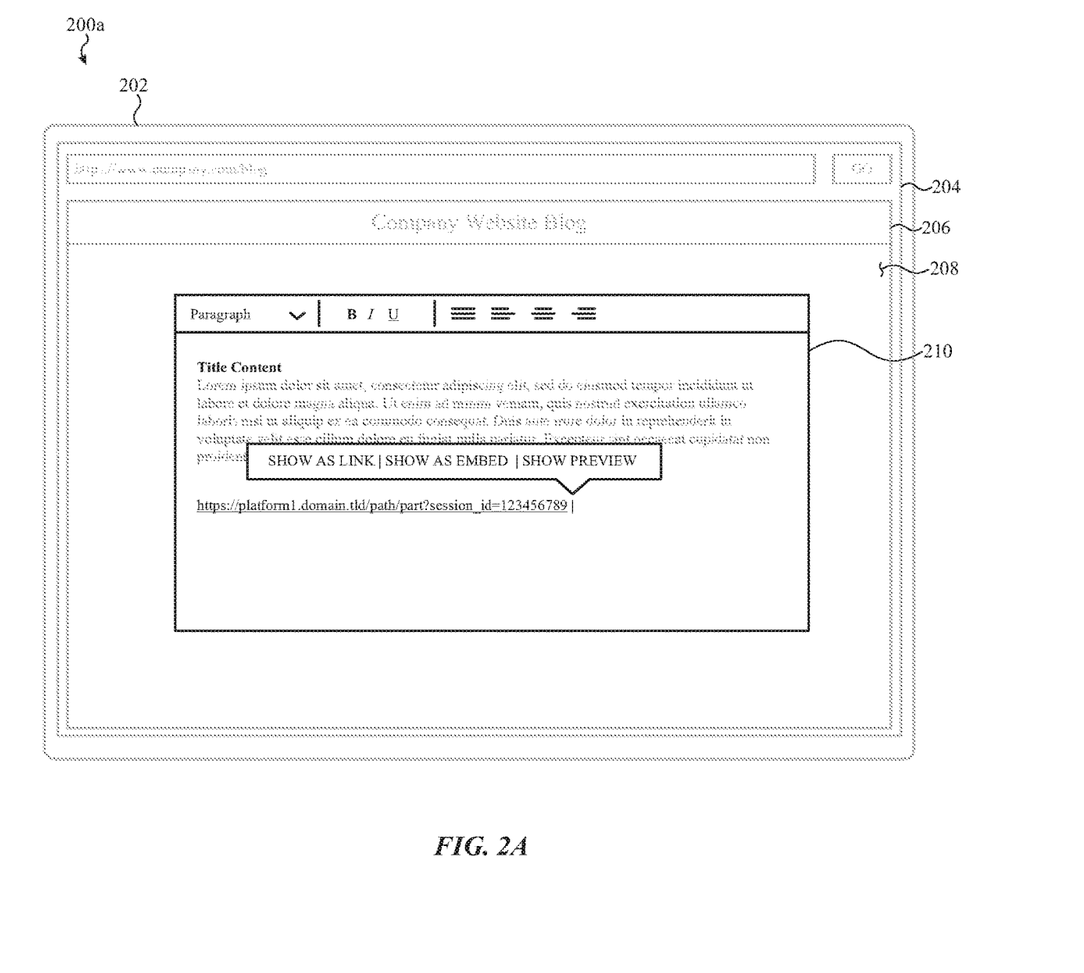
FIGS. 2A-2D depicts an electronic device executing an instance of a frontend application associated with a second software platform, the instance rendering a graphical user interface including interface elements of the FIG. 1, associated with a specific software component of the first platform.

For example, FIG. 2A depicts a client device 200 that may be configured in a similar manner as the client deice 100 of FIG. 1. However, in this example illustration, the client device 200 executes an instance of a frontend application associated with a different platform, such as a blogging platform. In a similar manner to FIG. 1, the client device 200 can include a display 202 that renders a graphical user interface 204 that includes a content view 206 that, in turn, can be used to render various user interface elements.

In some cases, the content view 206 can include a frame 208 into which the document creation interface component 108 of FIG. 1, associated with the documentation service of FIG. 1 can be rendered. In particular, in the illustrated embodiment, the document creation interface component is identified as the document creation interface component 210.

As with other embodiments described herein, the blogging platform shown in FIG. 2 may submit a request to an auth token translator/proxy service that can convert a user auth token associated with the blogging platform into a valid user auth token of the documentation platform of FIG. 1. Once the frontend of the blogging platform receives this token, the blogging platform frontend can create a request to the backend of the documentation service for the document creation interface component 210. In response, the backend of the documentation service can provide all necessary HTML, CSS, JavaScript and/or other assets so that the document creation interface component 210 can be rendered within the frame 208 and can maintain authenticated communications with the backend of the documentation service.

As a result of the maintained communication with the backend of the documentation service, users of the blogging platform can enjoy access to all features of the document creation interface component 210, including formatting, text entry, and URL processing such as described above with reference to the URL 112 and the overlay interface 114 of FIG. 1.

These foregoing embodiments depicted in FIGS. 1-2A and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2B:
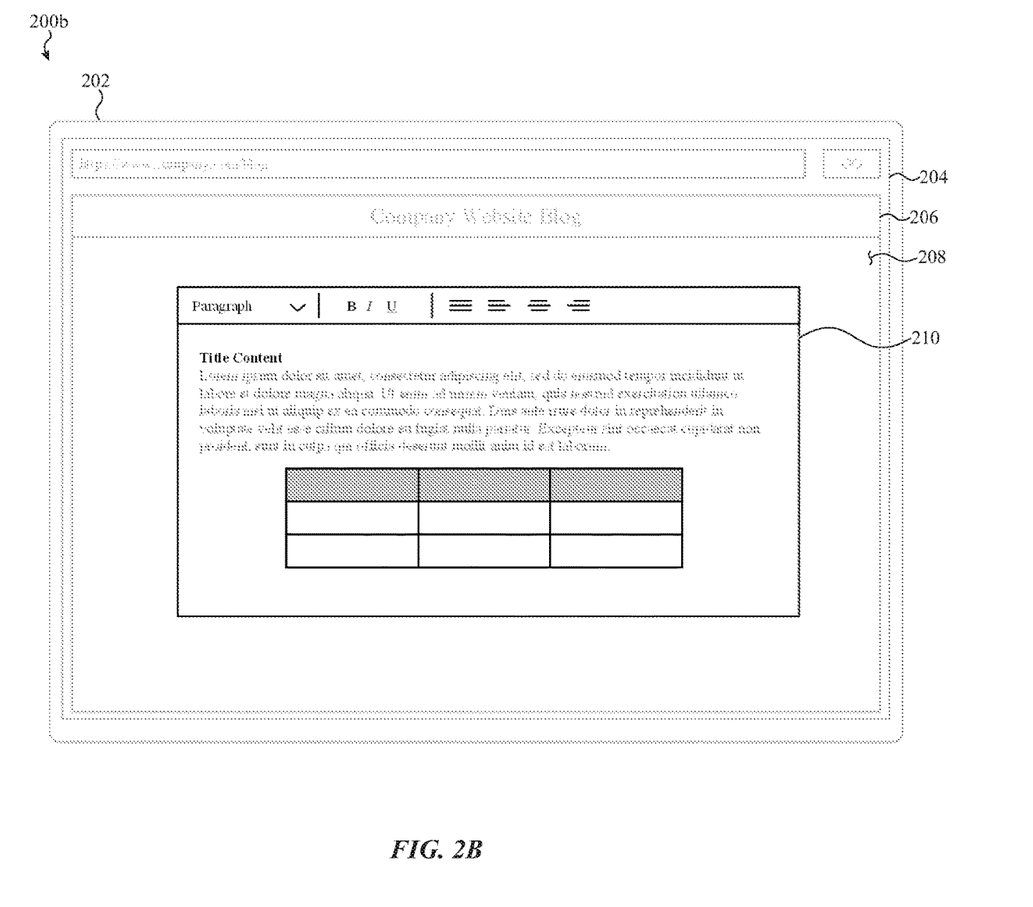
Figure 2C:
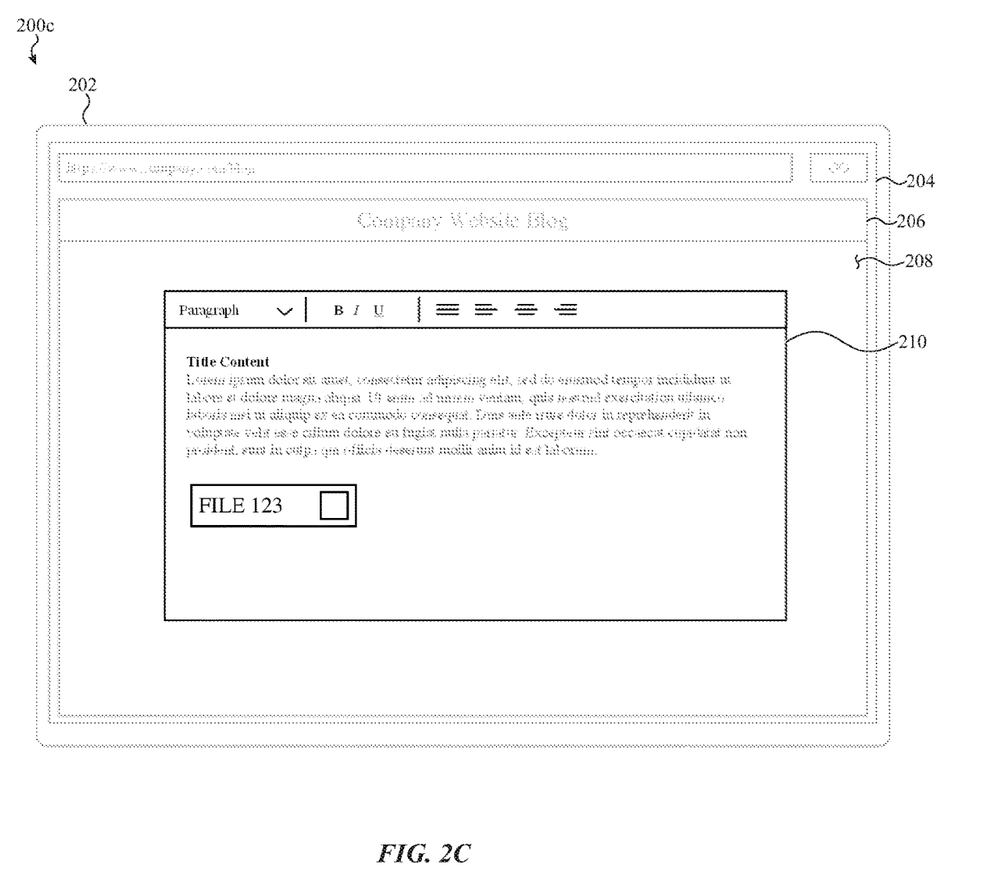

For example, FIG. 2B depicts the electronic device of FIG. 2A rendering a different feature or function of the first platform shown in FIG. 1. In particular, FIG. 2B depicts a graphical user interface that includes a graphical rendering/presentation of data. In the illustrated example, data may be presented in tabular form, but it is appreciated that this is merely one example; any suitable graphical component or rendering component of the first platform may be used/accessed by the second platform such as shown in FIG. 2B. Further, FIG. 2C depicts yet another feature or function of the first platform being leveraged by the second platform to render a graphical user interface. In this figure, a file conversion dialog or service affordance can be rendered to afford a user of the second platform an ability to modify, upload, download or otherwise access files in a manner defined and/or enabled by the first platform.

These foregoing examples are not exhaustive of the different user interfaces that may be rendered while using a system such as described herein. For example, in some embodiments, a request for a component as a service may be configurable by a developer of a service desiring to leverage that component. For example, the developer of a second platform attempting to leverage a component of a first platform may request an API key from the first platform. When requesting the API key (that accompanies future API calls, including user auth tokens and/or tenant tokens or developer tokens or keys), the developer may select particular features of the first platform's feature set to inform the first platform of the particular component required to be served as a service.

Figure 2D:
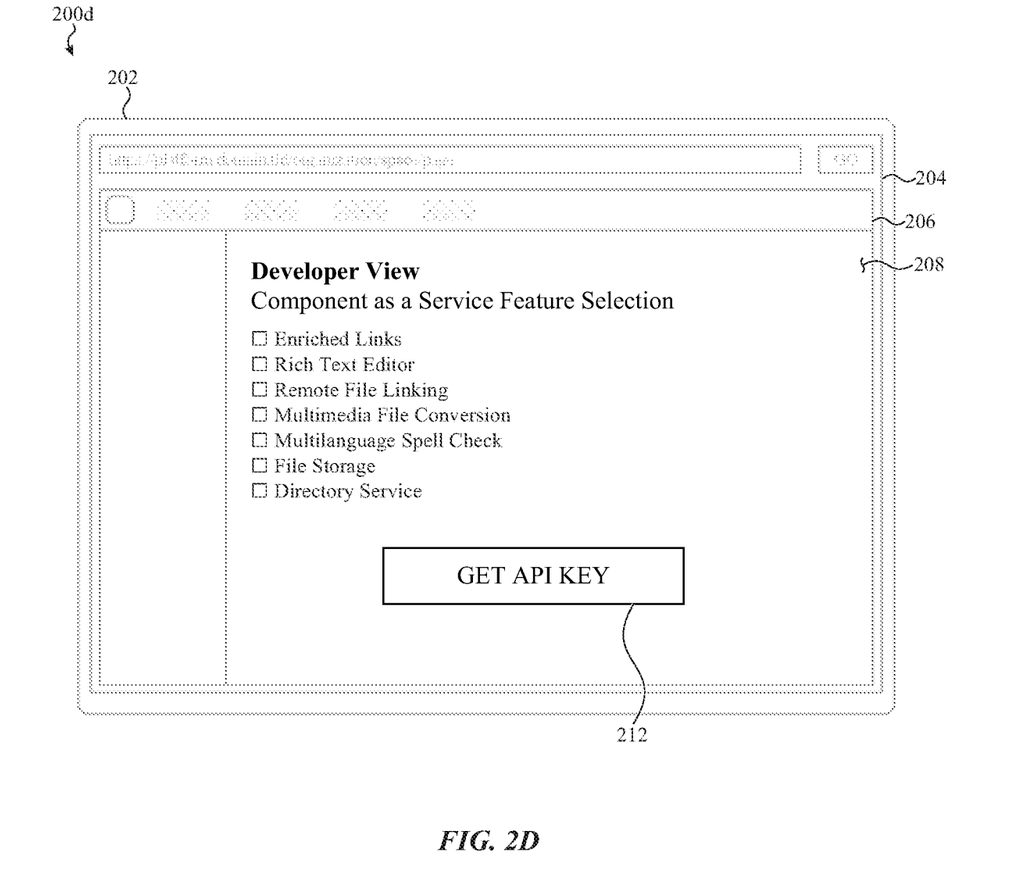

FIG. 2D depicts an example user interface that may be used by such a developer. The user interface, as with other user interfaces described herein can be rendered on a client device 200d that includes a display 202 rendering a graphical user interface 204 including a content view 206 in which a frame 208 may be shown. The frame 208 can render a set of components that a particular software platform can provide as a service. The listing may be a comprehensive feature list or may be a limited feature list. In this example, seven example components are shown; it is appreciated that this is merely one example. Once a developer determines and selects one or more features of interest, the developer may request an API key, for example by engaging an affordance 212. Once an API key is requested, the platform to which the request was directed can issue a (in many cases revokable) API key, for the developer to append to future API calls to that platform.

Figure 3:
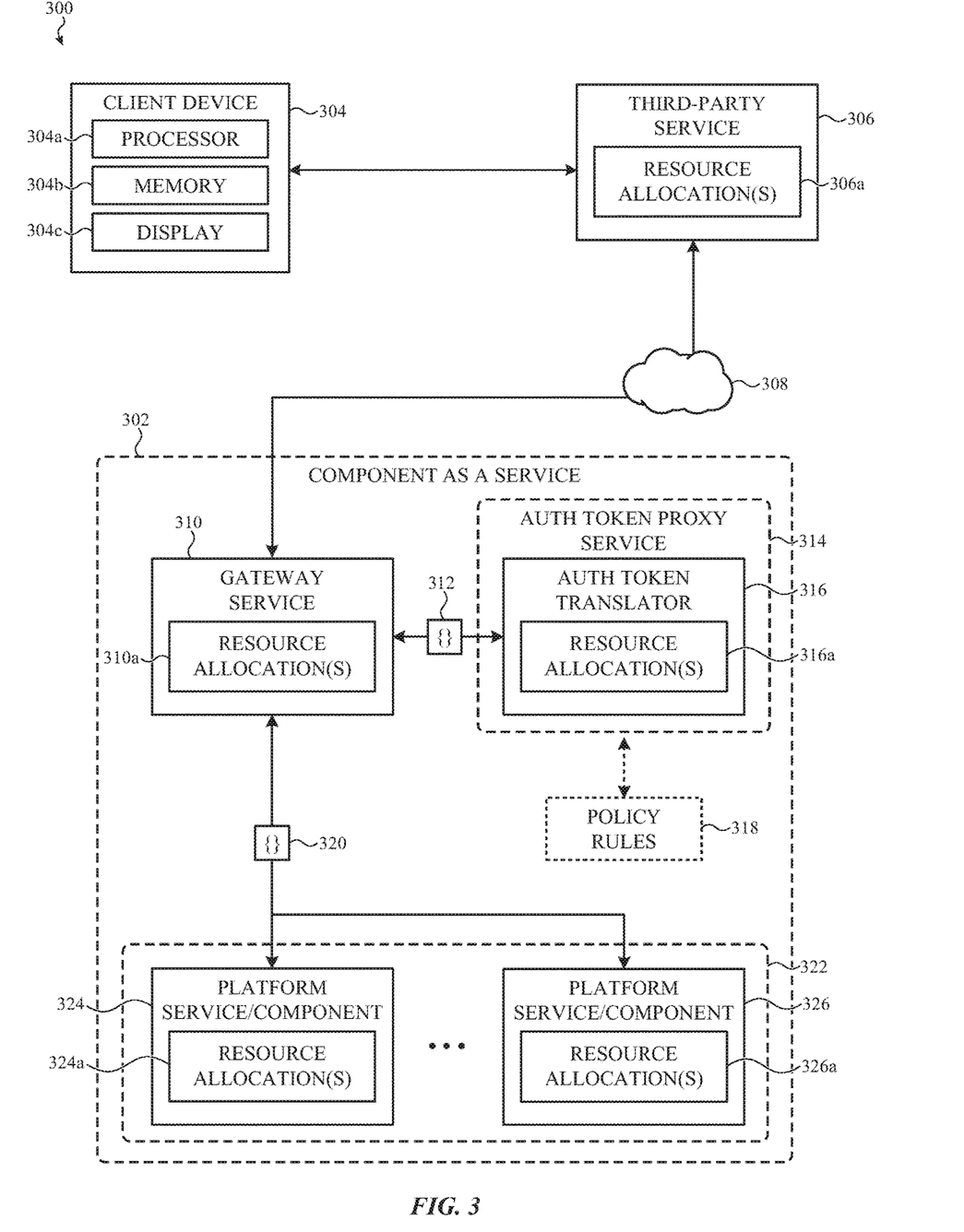
FIG. 3 depicts a simplified architecture diagram of a system, such as described herein, configured to provide a software component of a first platform to a second platform, as a service.

FIG. 3 depicts a simplified diagram of a system for translating authentication tokens between platforms so as to allow software components of different software platforms to be shared between platforms in a secure and authenticated manner, such as described herein.

The system 300 can include a host service 302, which may be a virtual or physical computing resource (referred in many cases as a "cloud platform"). The host service 302 can be configured to provide one or more software components as a service to a client device 304 that is configured to operate a frontend instance of software associated with a third-party service 306. The third-party service 306 can be communicably coupled to the host service 302 via a network 308, which may include the open Internet.

As with other embodiments described herein, the frontend application instance on the client device 304 may be instantiated by cooperation of a processor 304a and a memory 304b. In particular, as with other embodiments described herein, the processor 304a may be configured to access the memory 304b to load an executable asset from the memory into a working memory. This operation can cause to be instantiated a frontend application associated with the third-party service 306 which, in turn includes one or more virtual or physical resource allocations 306a that are leveraged to instantiate a backend of the third-party service 306.

The frontend application instance may submit a request to access a feature of the third-party service 304 that is provided to the third party service as a component as a service by the host service 302. The request typically includes, as noted above, an auth token associated with a user of the third-party service 306.

Upon receiving the request, the backend instance of the third-party service 306 (instantiated by the resource allocations 306a) forwards the request to the host service 302. In many constructions, a gateway service 310 (instantiated by corresponding resource allocations 310a) receives the request, including the auth token, from the third-party service 306.

The gateway service 310 can forward the request as the structured data 312 to an authentication token proxy service 314 which includes an auth token translator 316 (likewise supported by the resource allocations 316a). As noted above, the auth token translator 316 can be configured to convert the auth token received with the request from the frontend executing on the client device 304 into an auth token suitable to access another platform. In addition, the auth token translator 316 can be configured to determine whether the resulting, translated, auth token and/or a user of the other platform(s) associated with the translated auth token is actually authorized to access the requested resource. In particular, the auth token translator 316 can be configured to verify policy compliance by leveraging a policy compliance and/or policy rules service or database 318.

Upon determining that the translated auth token is associated with an account that is permitted to access the resource requested by the frontend, the auth token translator 316 can return a modified version of the original request back to the gateway service 310 that can, in turn, direct the modified request to one of the third party service 306, the client device 304, or one or more platforms or components referenced by the request itself. As one example, the modified request may be forwarded as the modified request 320 to one or more software platforms 322, which can include a first platform 324 or a second platform 326 (each respectively supported by the resource allocations 324a and 326a).

In response to receiving the modified request 320, the first platform 324 or the second platform 326 can provide a response to the third-party service 306 and/or the client device 304 to cause a display 304c of the client device to render in a frame of a graphical user interface of the frontend, a software component or interface component associated with and hosted by the first platform 324 or the second platform 326.

These foregoing embodiments depicted in FIG. 3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
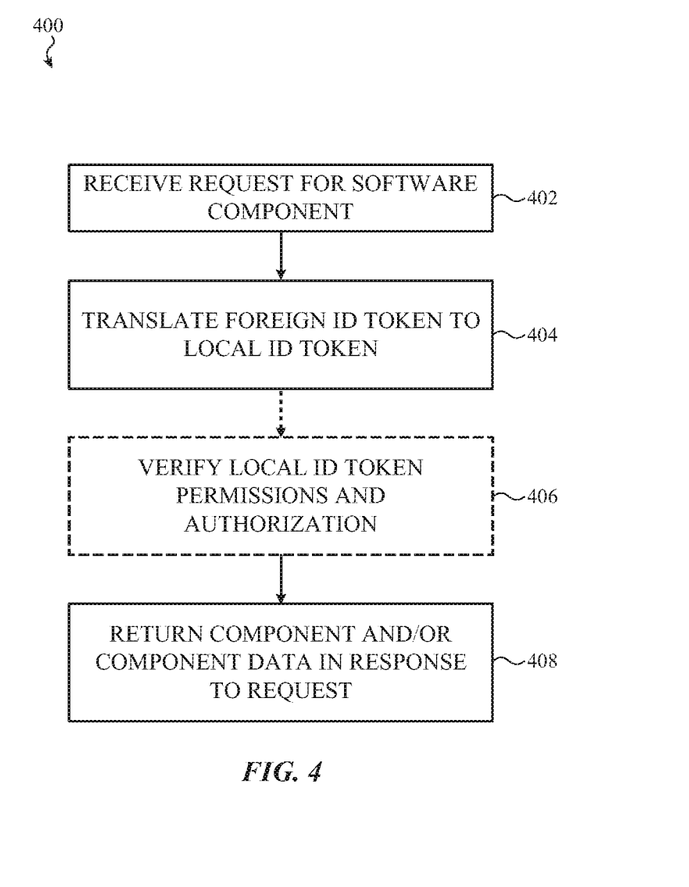
FIG. 4 is a flowchart depicting example operations of a method of providing a software component as a service.

FIG. 4 is a flow chart depicting example operations of translating a user auth token (or user ID or other identifier) between platforms. The method 400 can be performed by a system as described herein.

The method 400 includes operation 402 at which a request is received to access a particular software component. Next at operation 404, a foreign ID (e.g., an identifier or token associated with a particular software platform) is translated into a local ID (e.g., an identifier or token associated with a different software platform). Next, at optional operation 406, the local ID may be analyzed to determine whether a user associated with that ID is permitted and authorized to view the requested resource. Finally at operation 408, the original request may be serviced and data may be provided to the originator of the initial request. As with other embodiments described herein, the original request can be modified by an end user device, a first platform, and/or a gateway device such as described above. In other cases, an original token as described herein can be submitted to the second platform which, in turn, can accept the second token (in lieu of generating a new token specific to the second platform). Many embodiments are possible in view of the examples provided herein.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Furthermore the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A method of providing a software feature of a document collaboration platform as a service to a second platform, the method comprising:
    receiving, at the document collaboration platform, a request from a client device to access the software feature from an instance of a frontend application of the second platform executing on the client device, the frontend application instance having:
        rendered a graphical user interface;
        received instructions to render in a frame of the graphical user interface an interface component associated with the software feature of the document collaboration platform; and
        generated in response to the instructions, the request comprising a first authentication token having been presented by the frontend application instance to access the second platform;
    identifying, by the document collaboration platform, a first user account of the document collaboration platform that is associated with a second user account of the second platform to which the first authentication token was issued;
    determining, by the document collaboration platform, that the first user account is authorized to access the software feature; and
    generating, by the document collaboration platform, a response to the second platform, the response comprising:
        a resource location at the document collaboration platform and associated with the software feature; and
        a second authentication token associated with the first user account and the document collaboration platform;
    transmitting the response from the document collaboration platform to the second platform;
    receiving at the document collaboration platform, a third request directed to the resource location, the third request comprising the second authentication token;
    transmitting to the frontend application instance of the second platform, from the software feature, instructions to render the interface component; and
    causing the interface component to be rendered, by the frontend application instance, in the frame of the graphical user interface.

2. The method of claim 1, wherein the resource location comprises a URL.

3. The method of claim 1, wherein the second authentication token is encrypted with a private key associated with the document collaboration platform.

4. The method of claim 1, wherein the first authentication token is encrypted with a private key associated with the second platform.

5. The method of claim 4, further comprising decrypting the first authentication token with a private key associated with the document collaboration platform.

6. A document collaboration platform comprising:
    a memory allocation storing an executable asset; and
    a processor allocation intercoupled with the memory allocation and configured to operate with the memory allocation and the executable asset to instantiate an instance of a backend application, the backend application instance providing server-side functionality of the document collaboration platform, the backend application instance configured to:
        receive a request to access a graphical user interface component of a software feature of the document collaboration platform from a frontend application instance associated with a second platform and executing on a client device, the frontend application instance having:
            presented a first authentication token to access the second platform;
            received an instruction to render the graphical user interface component; and
            generated the request with the first authentication token and transmitted the request to the backend application;
        associate the first authentication token to a second authentication token issued in respect of the document collaboration platform;

determine whether the second authentication token is valid and issued to a user of the document collaboration platform;

determine that the user is permitted to access the software feature; and causing to be rendered in a frame of the frontend application instance the graphical user interface component of the software feature by:

generating, by the document collaboration platform, a response to the frontend application instance, the response comprising:

a resource location at the document collaboration platform and associated with the graphical user interface component; and the second authentication token;

transmitting, by the document collaboration platform to the frontend application instance, the response.

7. The document collaboration platform of claim 6, wherein the first authentication token is encrypted.

8. The document collaboration platform of claim 7, wherein the backend application instance is configured to decrypt the first authentication token prior to determining whether the first authentication token is associated with a user of the document collaboration platform.

9. The document collaboration platform of claim 6, wherein the software feature comprises one of:

an authentication feature;
a documentation feature;
a media renderer feature;
a file management feature;
a project management feature; or
a data display feature.

* * * * *